A. I. GERRY.
BLEND MAKING MACHINE FOR STAPLE GOODS.
APPLICATION FILED OCT. 12, 1911.

1,034,996.

Patented Aug. 6, 1912.

5 SHEETS—SHEET 1.

WITNESSES
H. J. Walker
Walton Harrison

INVENTOR
Alberto I. Gerry
BY
ATTORNEYS

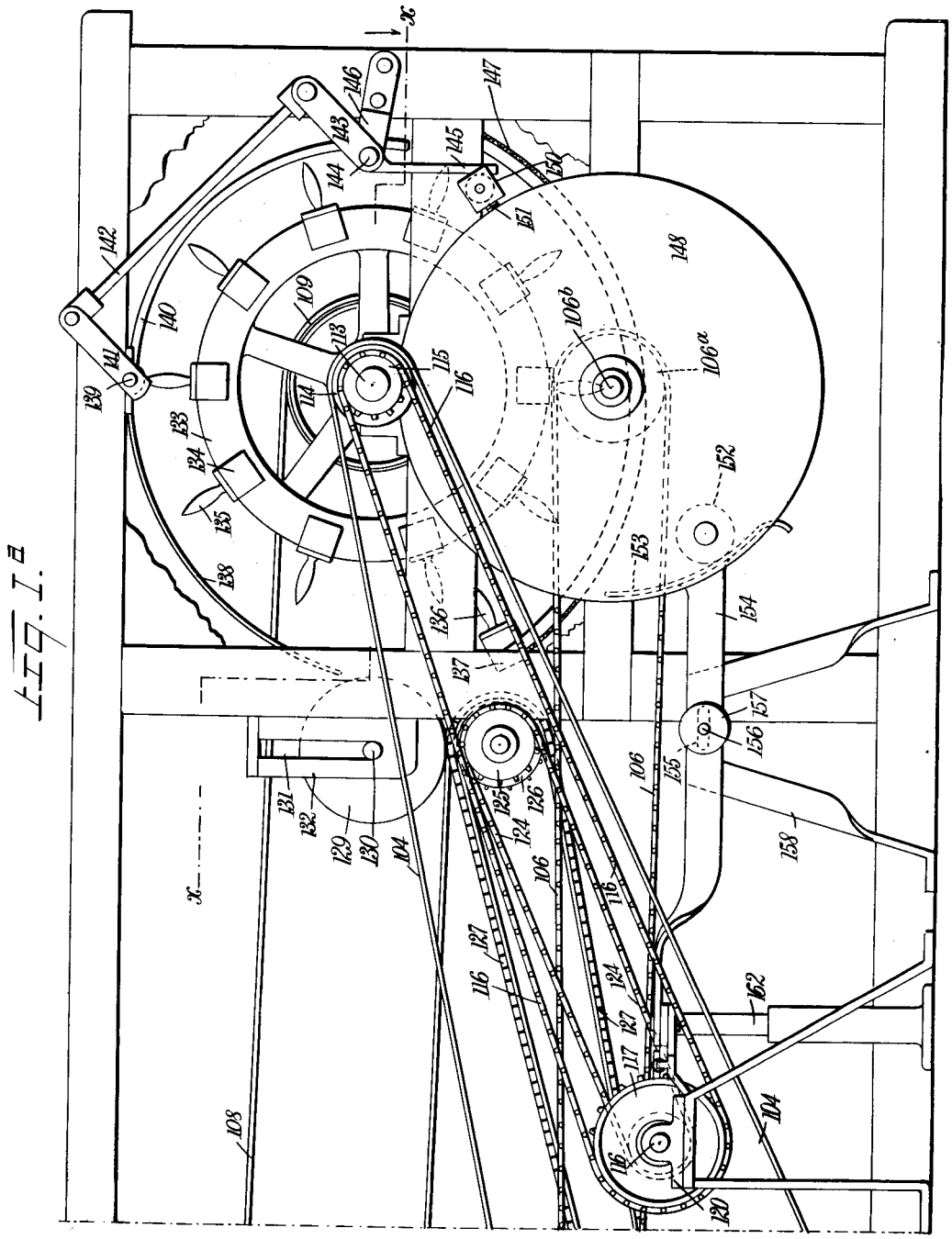

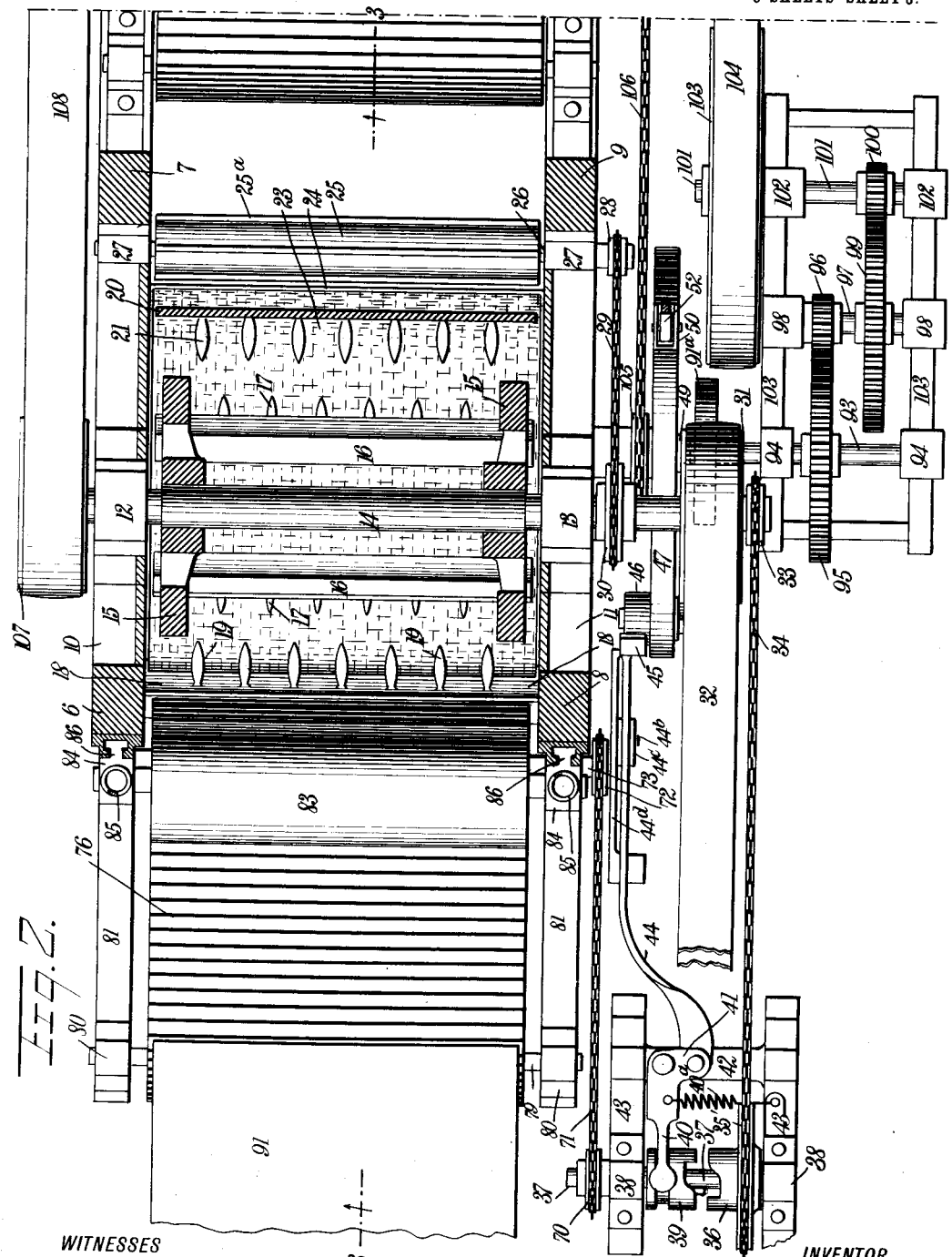

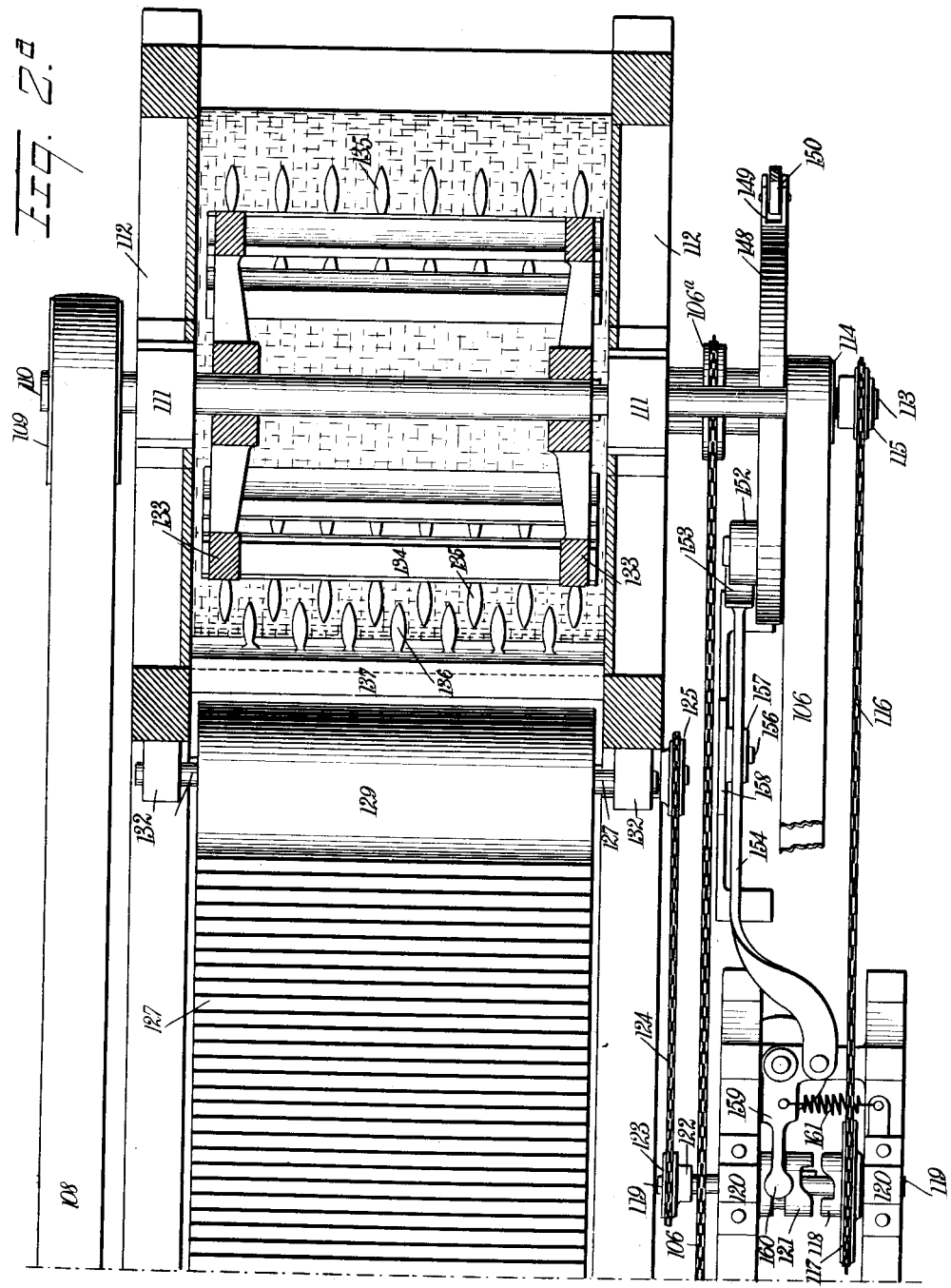

A. I. GERRY.
BLEND MAKING MACHINE FOR STAPLE GOODS.
APPLICATION FILED OCT. 12, 1911.

1,034,996.

Patented Aug. 6, 1912.
5 SHEETS—SHEET 5.

WITNESSES

INVENTOR

ATTORNEYS

UNITED STATES PATENT OFFICE.

ALBERTO IRVING GERRY, OF SANFORD, MAINE.

BLEND-MAKING MACHINE FOR STAPLE GOODS.

1,034,996. Specification of Letters Patent. Patented Aug. 6, 1912.

Application filed October 12, 1911. Serial No. 654,214.

*To all whom it may concern:*

Be it known that I, ALBERTO I. GERRY, a citizen of the United States, and a resident of Sanford, in the county of York and State of Maine, have invented a new and Improved Blend-Making Machine for Staple Goods, of which the following is a full, clear, and exact description.

My invention relates to blend making machines for staple goods, that is, to machines for mixing or blending goods, such as cotton and linen shredded scraps, shoddy and various other materials of a textile character.

More particularly stated my invention comprehends certain improved mechanism whereby the mixing and blending are done with a minimum of hand work, the material being thoroughly intermingled as well as cleaned during the operation, the action of the mechanism being such that the material is fed into the machine in charges of predetermined size, these charges being admitted at intervals when various movable parts of the mechanism are in suitable positions for the charges to be taken in. I find that the mixing and blending can be done to better advantage if the material is first operated upon in a mixing chamber and is thence transferred to another mixing chamber and there again operated upon under somewhat different conditions.

My invention further comprehends various devices for adjusting movements of various movable parts comprised in and forming a part of my improved machine.

Reference is to be had to the accompanying drawings forming a part of this specification in which like characters of reference indicate corresponding parts in all the views, and in which—

Figure 1:
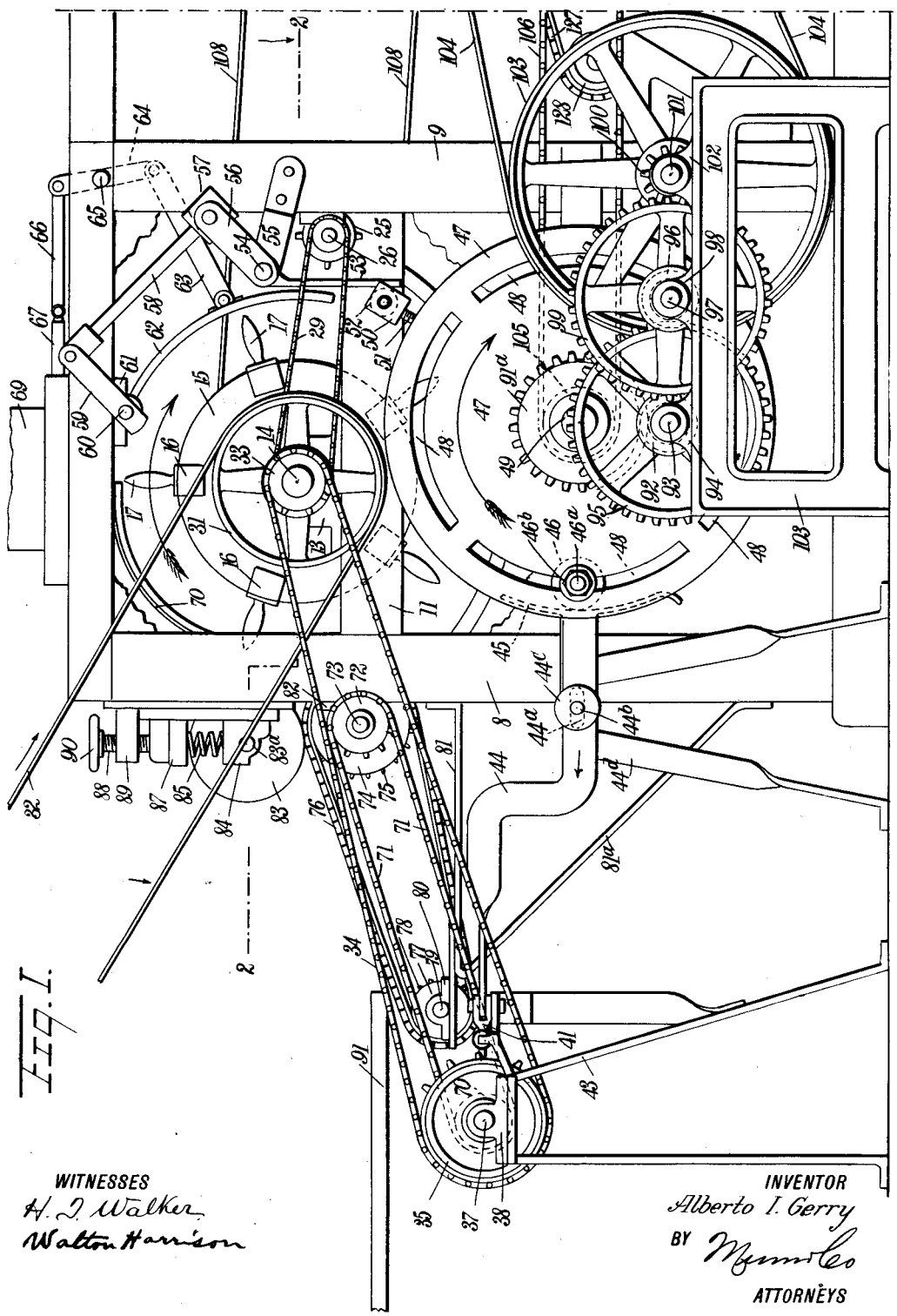
Figure 3:
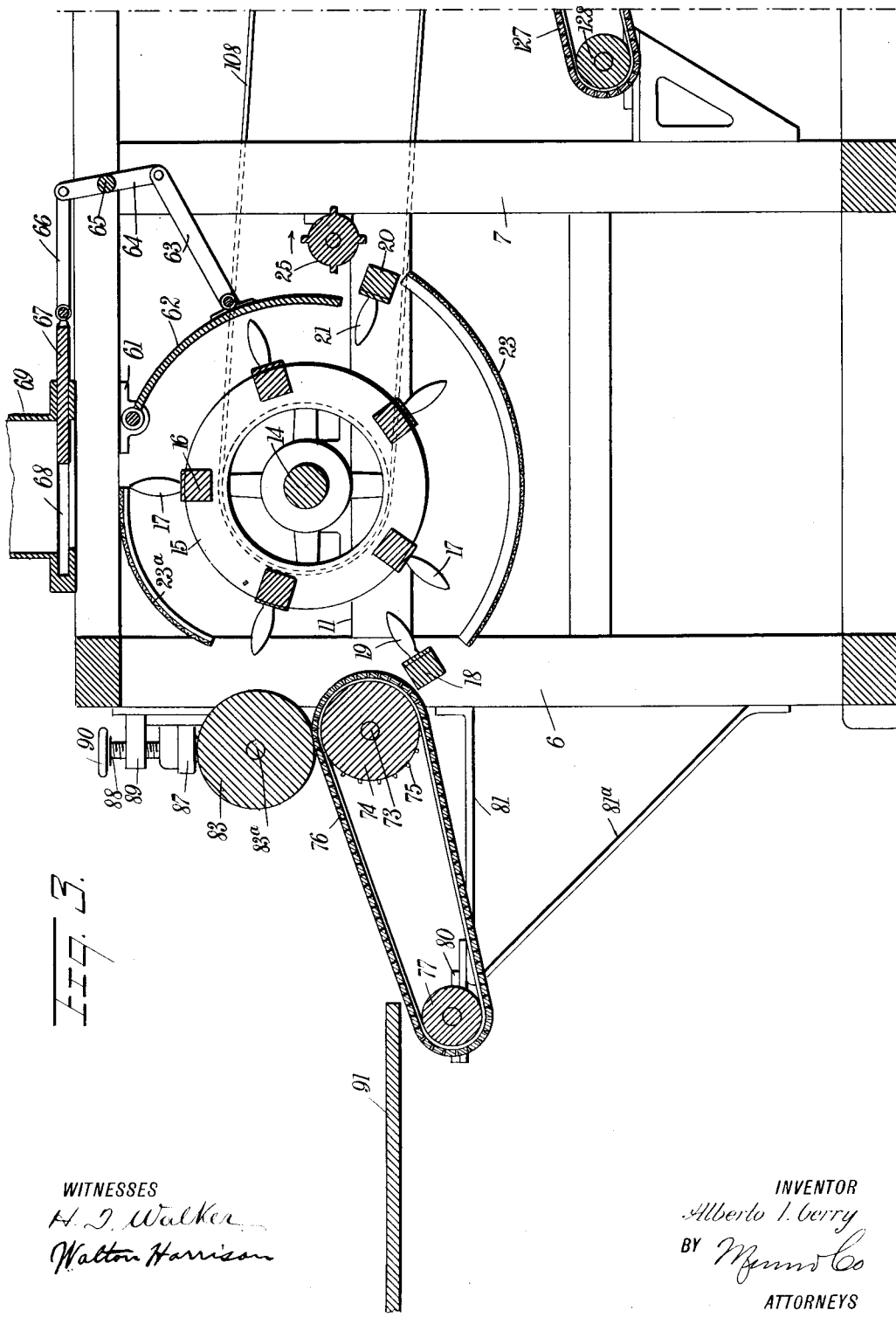

Figure 1 is a fragmentary side elevation of the machine, and shows the first mixing chamber and various parts associated therewith; Fig. 1ᵃ is a fragmentary side elevation, and shows the second mixing chamber and parts appertaining to the same; Fig. 2 is a section on the line 2—2 of Fig. 1, looking in the direction of the arrow; Fig. 2ᵃ is a section on the line x—x of Fig. 1ᵃ looking in the direction of the arrow; and Fig. 3 is a vertical section on the line 3—3 of Fig. 2, looking in the direction of the arrow.

Posts 6, 7, 8 and 9, horizontal beams 10 and 11 connected therewith, and various other parts together constitute a framework for supporting many of the movable parts. Bearings 12, 13 are mounted upon this framework. A shaft 14 is supported by the bearings 12, 13 and is fitted with two wheels 15. Bars 16 are mounted upon these wheels and are provided with teeth 17. Another bar 18 is supported by the framework and is provided with teeth 19. Parallel with the bar 18 is another bar 20, likewise mounted upon the framework, and provided with teeth 21. A screen 23, made preferably of wire, is bent into an arcuate form and extends across the framework below the shaft 14. This screen is supported upon a frame 24.

A roller 25 provided with ribs 25ᵃ is mounted rigidly upon a shaft 26, the latter being supported by bearings 27. The shaft 26 carries a sprocket pinion 28, and meshing with the latter is a sprocket chain 29. This sprocket chain also engages a sprocket wheel 30, which is mounted upon the shaft 14. This shaft carries another sprocket wheel 33 and engaging the latter is a sprocket chain 34 which in turn engages a sprocket wheel 35. This sprocket wheel is provided with a hub 36 which is formed into a clutch member and is mounted loosely upon a revoluble shaft 37. Two bearings 38 support this shaft, and splined upon this shaft is a clutch member 39 which mates the clutch member 36. A clutch fork 40 is connected with the clutch member 39 for the purpose of moving the same in the general direction of the axis of the shaft 37. A spring 40ᵃ is connected with the fork 40 for the purpose of normally maintaining it in a predetermined position.

A lever 41 is journaled upon a cross beam 42, the latter being supported by frame pieces 43. Pivotally connected with the lever 41 is a thrust bar 44. This thrust bar is provided at one of its ends with a cam 45 having generally an arcuate form. The thrust bar 44 is provided with a slot 44ᵃ, and extending through the latter is a guide pin 44ᵇ. Mounted upon this guide pin is a disk 44ᶜ. The guide pin is supported by a frame piece 44ᵈ. The thrust bar 44 has a movement substantially in the general direction of its length, this movement being limited by the length of the slot 44ᵃ.

A tripping roller 46 is carried by a wheel 47, the latter being provided with arcuate slots 48, as will be understood from Fig. 1. The tripping roller 46 is adjustable relatively to the wheel 47 by aid of a pin 46ᵃ and a nut 46ᵇ. By loosening the nut, the pin may be mounted in any one of the slots 48, or may be moved to any preferred portion of the slot in which it is mounted. While, in this instance, I show four slots 48 and only one roller 46, I do not limit myself thereby, as any number of slots and rollers of the kind described may be employed. The wheel 47 is mounted rigidly upon a shaft 49. This wheel carries, upon its outer periphery, a fork 50. This fork has a threaded portion 51 which screws into a hole in the edge of the wheel 47.

Journaled within the fork 50 is a tripping roller 52. Disposed adjacent to the path of travel of this roller is a tripping lever 53 which is journaled upon a stationary pin 54, the latter being mounted upon a bracket 55 supported by the framework. The tripping lever is provided with an extending portion 56. A pitman 58 is, by aid of a bearing 57, journaled upon the upper end of the portion 56. An arm 59 is pivotally connected with the pitman and is mounted rigidly upon a rocking shaft 60. This shaft is journaled within bearings 61 and supports a door 62, the latter having generally the form of sector. Connected with the door 62 is a rod 63 and pivoted to the latter is a lever 64 which is mounted upon a shaft 65. Connected with the upper end of the lever 64 is a rod 66 which is connected with a sliding door 67. The sliding door 67 works in a slide-way 68, as will be understood from Fig. 3, and associated with this door is a dust flume 69. When the door 62 (see Figs. 1 and 3) is swung to the right, according to these figures, as hereinafter described, the door 67 closes the bottom of the dust flume 69; yet when the door 62 occupies its normal position, the bottom of the flume 69 is open.

A screen 23ᵃ having generally an arcuate form is supported by the framework and located partially beneath the flume 69. Mounted rigidly upon the shaft 37 is a sprocket wheel 70. A sprocket chain 71 engages this wheel and also engages another sprocket wheel 72, the latter being mounted upon a revoluble shaft 73. A roller 74 is mounted rigidly upon the shaft last mentioned, and is provided with bosses 75. An endless apron 76 engages the roller 74 and is prevented from slipping relatively thereto by the bosses 75. This endless apron also engages a roller 77 provided with bosses 78, and mounted upon a shaft 79, the latter resting in bearings 80. These bearings are mounted upon brackets 81 and for supporting these brackets I provide braces 81ᵃ which, at their lower ends, are secured upon the framework. The shaft 73 is mounted in bearings 82 likewise supported by the framework.

A roller 83 is mounted upon a shaft 83ᵃ, the latter being mounted in bearings 84. These bearings are engaged by springs 85 and are adapted to move up and down slightly. For this purpose they are fitted into slide-ways 86, as will be understood from Fig. 2. Engaging the springs 85 are movable heads 87. These heads are pivotally connected to screws 88, the latter being mounted in bearings 89 which are stationary in the framework. The screws 88 are provided with hand wheels 90 whereby they may be turned. The operator, by turning the hand wheels 90, may increase or diminish the tension of the springs 85, and consequently by regulating the tension of these springs upon the bearings 84, he may control the degree of pressure exerted downwardly by the roller 83. This roller rests upon the traveling apron 76 and is driven thereby. A feed board is shown at 91 (see left of Fig. 2) and is so located as to partially overlap the traveling apron 76.

Mounted upon the shaft 49 is a gear wheel 91ᵃ which meshes with a gear pinion 92, the latter being mounted rigidly upon a revoluble shaft 93 which is supported by bearings 94. The shaft 93 carries a gear wheel 95 which meshes with a gear pinion 96 carried by a shaft 97. This shaft is mounted in bearings 98 and carries a gear wheel 99 which meshes with a gear pinion 100. This gear pinion is mounted rigidly upon a shaft 101 which is journaled in bearings 102. The shaft 101 carries a belt pulley 103, and engaging the latter is a belt 104. Mounted upon the shaft 49 is a sprocket wheel 105 and engaging the latter is a sprocket chain 106, this chain also engaging a sprocket wheel 106ᵃ which is rigidly mounted upon a shaft 106ᵇ.

The shaft 14 (see upper portion of Fig. 2) carries a belt pulley 107, and engaging the latter is a belt 108 which extends along the machine and engages another belt pulley 109, as indicated in the upper portion of Fig. 2ᵃ. This pulley is mounted upon a shaft 110 which is supported by bearings 111 upon a framework 112. The shaft 110 is provided with a reduced portion 113, and mounted upon the latter is a sprocket wheel 115. A sprocket chain 116 engages this sprocket wheel and also engages another sprocket wheel 117 which is carried by a revoluble shaft 119, and is provided with a hub portion 118 fashioned into a clutch member. The shaft 119 is mounted in bearings 120. Another clutch member 121 mating the clutch member 118 is splined upon the shaft 119 and consequently movable in the general direction of the length thereof. A sprocket wheel 123 is provided with a hub portion 122 and, by aid of the latter, is mounted rigidly upon the shaft 119. A sprocket chain 124 engages the sprocket wheel 123 and also engages another sprocket wheel 125. A roller 126 is connected with the sprocket wheel 125 and revoluble thereby. Engaging the roller 126 is a traveling apron 127 which also engages a roller 128, as will be understood from Fig. 3. A roller 129 rests upon the traveling apron 127 where the latter is supported by the roller 126, as will be understood from Fig. 1$^a$. The roller 129 is provided with a shaft 130 which extends through slots 131 in brackets 132, the latter being supported upon the framework. The shaft 110 carries a pair of disks 133 (see Fig. 2$^a$) mounted rigidly upon it, and secured to these disks are cross bars 134 carrying teeth 135. Other teeth 136 are mounted upon a stationary bar 137, the latter extending across the framework, as will be understood from Fig. 1$^a$. A screen 138 having generally the form of a sector is mounted upon the framework. A rocking shaft 139 supports a door 140, the latter having a general arcuate form, and rigidly connected with the rocking shaft 139 is an arm 141, and pivotally connected with the latter is a pitman 142. This pitman is pivoted to a lever 143 which is mounted to rock upon a pin 144 and is provided with a downwardly extending portion 145. The pin 144 extends from a bracket 146. A screen 147 having a general arcuate form extends across the framework.

A wheel 148 is mounted rigidly upon the shaft 106$^b$. A fork 149 carries a roller 150 journaled therein and is provided with a screw portion 151 which extends into the edge of the wheel 148. The parts are so arranged that as the wheel turns, the roller 150 is periodically brought against the portion 145 of the lever 143 so as to trip this lever, and by actuating the pitman 142 and arm 141 raises the door 140, which normally occupies the position indicated in Fig. 1$^a$. Journaled upon the wheel 148 is a roller 152. A cam 153 having generally an arcuate form is disposed partially within the path of orbital travel of the roller 152 and is mounted upon the end of a thrust bar 154. Extending through this thrust bar is a pin 156, a slot 155 being provided in the thrust bar for this purpose. A disk 157 is mounted upon the pin 156 and is supported by a frame member 158. The thrust bar 154 is pivotally connected with a bell crank lever 159, the latter carrying a clutch fork 160 which engages the clutch member 121. A spring 161 is connected with the bell crank lever 159 and with the framework. A post 162 supports the bell crank lever 159 and parts immediately associated with it.

Power is supplied to the machine by aid of the belt 32 so as to turn the pulley 31 in a clockwise direction, according to Fig. 1. This turns the shaft 14 carrying the wheels 15 and cross bars 16. The roller 25, driven by aid of the sprocket chain 29, turns in the same direction as the pulley 31. The sprocket wheel 35 and clutch member 36, driven by aid of the sprocket chain 34, are turned in a clockwise direction according to Fig. 1, and as the clutch member 36 normally runs idly upon the shaft 37, the sprocket wheel 70 is inactive except when the clutch member 39 is forced against the clutch member 36 by action of the spring 40$^a$ acting upon the lever 41, as will be understood from Fig. 2. The spring, however, tends to keep the clutch member 39 in engagement with the clutch member 36, and, as a consequence, these clutch members remain in engagement except when the thrust bar 44 is moved to the left, according to Figs. 1 and 2, this movement of the thrust bar being accomplished by the roller 46 striking against the foot 45 during the slow rotation of the wheel 47, as hereinafter described. Each time the thrust bar 44, by its movement to the left, throws the clutch member 39 out of engagement with the clutch member 36, the sprocket wheel 70 stops turning, but at all other times the rotation of this sprocket wheel drives the sprocket chain 71, the latter in turn causing the sprocket wheel 72 to turn in a clockwise direction, according to Fig. 1. The roller 74 is thus driven in the same direction and the traveling apron 76 is so operated that its upper surface moves from the feed board 91 toward the rollers 74, 83. The friction of the roller 83 upon the traveling apron causes the roller 83 to turn, but in a counter-clockwise direction, according to Fig. 1. Since the periodical stopping of the shaft 37 causes a periodical stopping of each element driven by its aid, the rollers 74, 83 and the traveling apron 76 are each rendered periodically idle, or rather are each periodically thrown into motion, the duration of this motion being short as compared with that of their inactivity. The continuous rotation of the shaft 14 causes the pulley 107 to drive the belt 108 so that the pulley 109 (see Figs. 1$^a$ and 2$^a$) is turned in a clockwise direction according to Fig. 1$^a$, and consequently the shaft 113 and parts carried by it are turned in the same direction. The disks 133 and cross bars 134 (carrying the teeth 135) are thus rotated in a clockwise direction, according to Fig. 1$^a$, the teeth 135 moving continuously past the stationary teeth 136. For convenience I designate the cross bars 134 and disks 133 as a "beater cylinder", this term being also applicable to the cross bars 16 and disks 15. The rotation of the shaft 110 causes the sprocket wheel 115 to communicate motion to the sprocket chain 116 by aid whereof the sprocket wheel 117 and clutch member 118 are driven. The clutch member 121 being splined upon the shaft 119, and the clutch member 118 running loose upon this shaft, the rotation of the shaft 119 is dependent upon the engagement of these clutch members. Whenever the shaft 119 turns, its rotation is in a clockwise direction, according to Fig. 1ª. The sprocket chain 124, driven by the sprocket wheel 123, communicates motion to the sprocket wheel 125 and thus turns the roller 126 in a clockwise direction, according to Fig. 1ª. This roller drives the apron 127 and the latter drives the roller 129 which turns in a counter-clockwise direction, according to Fig. 1ª. The upper portion of the traveling apron 127 moves to the right, according to Fig. 2ª, so long as the clutch members 121, 118 remain in engagement, but whenever the clutch member 121 is moved out of engagement with the clutch member 118, the traveling apron 127 and the rollers 125 and 129 come to a stop. The thrust rod 154 acts in the same manner as the rod 44 and is periodically driven to the left because of the periodical engagement of the roller 152 with the foot 153, as the wheel 148 is turned. The rotation of the shaft 110 causes the pulley 114 to communicate motion to the belt 104, the latter being so driven as to turn the pulley 103 in a clockwise direction, according to Fig. 1. The shaft 101, being thus turned, causes the rotation of the gear pinion 100, the latter turning the gear wheel 99 and the motion of the gear wheel being transmitted through the shaft 97 to the pinion 96 causes the gear wheel 95 to turn the shaft 93. The gear pinion 92 carried by this shaft communicates motion to the gear wheel 105, and the latter drives the sprocket chain 106. This sprocket chain communicates motion to the sprocket wheel 106ª, shown in Figs. 1ª and 2ª, and in so doing drives the shaft 106ᵇ. The wheel 148 is thus rotated so that the disk 152 is carried around continuously and is periodically brought into engagement with the cam 153 so as to actuate the thrust rod 154, as above described. The wheels 47 and 148 move slowly in the same direction and at the same rate of speed, which is clockwise according to Figs. 1 and 1ª. Each turn of the wheel 148 brings the roller 150 into engagement with the lower portion 145 of the lever 143, thus momentarily rocking this lever in a counter-clockwise direction and momentarily causing the door 140 to swing upward and outward. This occurs during a moment when the traveling belt 127 is stationary.

The operation of my device is as follows: The material to be mixed or blended is deposited in bulk upon the feed board 91 and may consist of a number of distinct kinds of stock. The operator shifts a portion of the material upon the traveling apron 76. Upon feeding the stock to the traveling apron 76, however, the operator has regard to proportions, and in some instances, to colors of the material. The quantity thrown upon the traveling apron is preferably a fixed charge. As the various mechanical parts are operated, as above described, the traveling apron 76 is soon thrown into motion for a moment. This passes the material between the rollers 83, 74, and into reach of the first beater cylinder which, as above explained, rotates continuously. As the teeth 17 move between the teeth 19, the material is thoroughly mixed and blended. The rotation of the beater cylinder also causes a draft of air to pass constantly upward through the dust flume 69 and the material is thus effectively cleaned. The dust flume is normally open at its bottom, because the gate 67 normally occupies its extreme position to the right, according to Fig. 3. Each time the rotation of the wheel 47 brings the roller 52 against the lever 56, so as to trip the latter, the door 62 is swung upwardly and away from the beater cylinder adjacent to it, the door 67 being momentarily closed as this occurs. The material is now blown to the right, according to Figs. 1 and 3, and passes over the roller 25 which is turning in a clockwise direction, according to these figures. The material being all out, the swinging door 62 and the sliding door 67 move back into normal position, and by this time another charge of material having been loaded upon the traveling apron 76 is admitted. The traveling apron 76 is never in motion while the doors 62, 67 are in their abnormal positions. As the material passes over the roller 25, it is deposited upon the traveling belt 127, and by aid thereof is carried to the right, according to Figs. 1ª and 2ª, and passes between the rollers 129 and 125 and into reach of the second beater cylinder shown in the figures last mentioned. Here the material is given a second beating and thus more thoroughly intermingled and blended. The treatment the material receives from the second beater cylinder is practically equal with that which it receives from the first one. In due course the revolution of the wheel 148 brings the roller 150 into engagement with the lower portion of the rocking levers 143 and causes the door 140 to swing upward and outward; that is, to open, and the material is thus discharged.

By adjusting the position of the bolt 46 relatively to the slot 48 in the wheel 47, the time relation of the movement of the thrust bar 44 may be controlled, within reasonable limits, and consequently the precise moment of starting and stopping the traveling apron 76 relatively to the movement of other parts may be controlled at will.

I do not limit myself to the precise construction shown and described, as variations may be made therein without departing from the spirit of my invention, the scope of which is commensurate with my claims.

Having thus described my invention, what I claim as new and desire to secure by Letters Patent is:—

1. A blend making machine comprising a framework, a beater cylinder disposed therein for mixing and blending a quantity of stock, mechanism for periodically discharging stock against said beater cylinder, a dust flume coacting with said beater cylinder for facilitating the movement of dust from said material while the latter is being operated upon by said beater cylinder, a door for closing said dust flume, a door for facilitating the discharge of said material from said beater cylinder, and mechanism connected with both of said doors for closing said first-mentioned door whenever said second-mentioned door is opened.

2. A blending machine comprising a beater cylinder, means for bringing into contact therewith a material to be blended, mechanism including a movable door for facilitating the discharge of impurities from said material, a movable door for facilitating a discharge of said material after said impurities are removed, and connections from said first-mentioned door to said second-mentioned door for closing said first mentioned door when said second-mentioned door is opened.

3. A blend making machine, comprising a framework, a beater cylinder disposed therein for mixing and blending a quantity of stock, mechanism for periodically feeding stock to said beater cylinder, including an adjustment wheel, a dust flume co-acting with said beater cylinder for facilitating the removal of dust from the material while the latter is being acted upon, a sliding door for closing the dust flume, a swinging door for facilitating the discharge of said material from said beater cylinder, a tripping lever having connection with said swinging door, a tripping member carried by said adjustment wheel and adapted to actuate said tripping lever during the rotation of the wheel, and an intermediately pivoted lever having connection at one end with said swinging door, and having connection at its opposite end with said sliding flume door, whereby said sliding door is closed and opened by the respective opening and closing movement of said swinging door.

4. A blend making machine, comprising a traveling apron, a beater wheel for receiving material from said traveling apron and for operating upon said material, a door for discharging said material after the latter is operated upon by said beater wheel, said door being normally closed, a lever having connection with said door for opening the same, a constantly rotating wheel, a tripping member carried by said wheel and adapted to engage and actuate said lever during its rotation, said wheel having an arcuate slot, and means whereby to periodically stop and start the traveling apron in relation to the opening and closing of the said door, embodying a clutch, a clutch actuating member having a cam at one end, and a roller adapted to engage said cam and having means whereby it may be adjustably positioned in said arcuate wheel slot.

5. In a blend making machine, the combination of a framework, a pair of beater wheels mounted therein, doors disposed adjacent to said beater wheels for discharging material received therefrom, means for turning said beater wheel, mechanism for opening said doors simultaneously, and means co-acting with one of the said doors for facilitating the discharge of impurities from said material while said doors are closed, said means being inoperative while said discharge doors are open.

6. A device of the character described comprising a traveling apron, mechanism for driving said apron, a clutch for disconnecting said mechanism and thereby stopping the travel of said apron, a beater wheel for receiving material from said traveling apron, driving means for actuating said beater wheel, a constantly rotating wheel having connection with said driving means and provided with an arcuate slot, a clutch operating member having a cam formed on its free end, and a roller for engaging said cam end and actuating the said member, said roller having means to secure the same in selected position in said wheel slot, whereby to advance or retard the time when said clutch is operated relatively to the movement of other parts.

In testimony whereof I have signed my name to this specification in the presence of two subscribing witnesses.

ALBERTO IRVING GERRY.

Witnesses:
Charles S. Lord,
Von. E. Gerry.